United States Patent Office 2,871,154
Patented Jan. 27, 1959

2,871,154

FUNGICIDAL COMPOSITIONS AND METHODS EMPLOYING LIPOIC ACIDS

Norman E. Searle, Wilmington, and Dale E. Wolf, Hockessin, Del., assignors to E. I. du Pont de Nemours and Company, Wilmington, Del., a corporation of Delaware No Drawing. Application October 11, 1955
Serial No. 539,941

5 Claims. (Cl. 167—22)

This invention relates to compositions and methods utilizing certain substituted 1,2-dithiolanes and their derivatives for combatting fungi and more particularly for controlling fungi which cause spoilage of fruits and vegetables.

This application is a continuation-in-part of our co-pending application Serial No. 535,741, filed September 21, 1955, now abandoned.

We have found that by applying certain substituted 1,2-dithiolane- and dimercapto- carboxylic acids and their derivatives to fruits and vegetables, such as for instance, apples, pears, strawberries, peaches, potatoes, tomatoes, lettuce, celery and the like; one can effectively control the growth of fungi causing fruit and vegetable decay.

Furthermore, these compounds are relatively palatable and non-toxic to humans and animals at the amounts required to provide fungicidal action.

The fungicidally effective substituted 1,2-dithiolanes and derivatives thereof employed as the active ingredients in the compositions and the methods of this invention are organic compounds, of molecular weight not exceeding 500 and of the formula

1.  R—R'—COR"

wherein R is

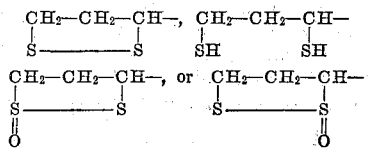

or C-alkyl derivatives thereof in which the alkyl groups contain not more than 4 carbon atoms, R' is a divalent hydrocarbon radical of up to 8 carbon atoms and R" is —OH or a group hydrolyzable thereto.

Illustrative of the compounds of Formula 1 useful in the compositions and processes of this invention are:

5-(1,2-dithiolane-3-yl)pentanoic acid (alpha-lipoic acid)
5-(5-methyl-1,2-dithiolane-3-yl)pentanoic acid
Ethyl-1,2-dithiolane-3-yl)-formate
4-tert.butyl-5(1,2-dithiolane-3-yl)pentanoamide
2-(1,2-dithiolane-3-yl)acetic acid
3-(1,2-dithiolane-3-yl)propionic acid
6-(1,2-dithiolane-3-yl)hexanoic acid
9-(1,2-dithiolane-3-yl)nonanoic acid
4-methyl-4-ethyl-4-(1,2-dithiolane-3-yl)-butyric acid
Oxidized 5-(1,2-dithiolane-3-yl)pentanoic acid (beta-lipoic acid)
6,8-dimercaptooctanoic acid (gamma-lipoic acid, also known as lipeic acid)
6,8-dimercaptononanoic acid
Ethyl-2,4-dimercaptobutyrate
4-tert.butyl-6,8-dimercaptooctanoamide
3,5-dimercaptopentanoic acid
4,6-dimercaptohexanoic acid
7,9-dimercaptononanoic acid
10,12-dimercaptododecanoic acid
4-methyl-4-ethyl-5,7-dimercaptoheptanoic acid
Sodium salt of 6,8-dimercaptooctanoic acid
1,2-dithiolane-3-enanthic acid
4-methyl-1,2-dithiolane-3-valeric acid
8,10-dimercaptodecanoic acid It will be understood that the compounds of Formula 1 include substituted dithiolanes in which one substituent is in the form of the free acid, an ester, an amide, the corresponding oxidized forms in which one atom of oxygen is attached to the disulfide ring, and the corresponding reduced forms in which the dithiolane rings is open to give a dimercaptan. The compositions employed in the present invention contains one or more of these.

As normally prepared the acids of Formula 1 are characterized by the absence of optical activity in that they are the racemic forms, the dl-mixture. It has been found that the free acids and suitable salts thereof such as for instance, the sodium salt, the potassium salt, or the calcium salt, are usually superior to other acid derivatives in compositions of the invention and for this reason the free acids and salts are preferred.

The compounds of Formula 1 can be prepared by the methods of copending U. S. applications, Serial No. 325,236, filed December 10, 1952 by Donald S. Acker and Charles W. Todd now Patent No. 2,752,374, Serial No. 325,237, filed December 10, 1952 by Donald S. Acker now Patent No. 2,752,373, which are referred to in U. S. Patent 2,706,158. Oxidation of the 1,2-dithiolanyl ring is readily effected by treating the products of the aforementioned Acker applications with tertiary butyl hydroperoxide. This results in the addition of one atom of oxygen to the disulfide ring.

Preferred compounds of Formula 1 employed in the compositions and methods of the present invention are alpha-lipoic acid and gamma-lipoic acid.

The dosage of the active ingredient required to give satisfactory protection of fruit and vegetables in most instances ranges from about 0.5 to 10.0 ozs. per bushel. In general, the optimum dosage is largely determined by and dependent upon the particular material being treated, the nature of the composition employed, the method of application, the required period of protection and the manner of handling the fruit or vegetables after treatment.

The compositions of our invention contain, in sufficient amount to protect fruit and vegetables from spoilage by the action of fungi, a compound of Formula 1 admixture with a carrier material. Usually from about 1%–95% by weight of the composition is active ingredient.

The carrier present in our compositions can be a liquid such as water. However, our preferred compositions are in the form of a wettable powders or dusts comprising the active ingredient and a finely divided inert solid carrier.

The powder and dust compositions can be prepared by admixing the active compound with the finely divided inert solids. Natural clays (either absorptive such as attapulgite or relatively non-absorptive such as china clays), diatomaceous earth, walnut shell flour, redwood flour, synthetic fine silica, calcium silicate and other inert carriers of the kind conventionally employed in pesticide compositions can be used. The active ingredient usually makes up from about 25 to 90% by weight of these powder compositions.

The powder compositions can be used as such by dusting them onto the fruit and vegetables subject to fungus infestation. Alternatively, the powders can be suspended in large quantities of water and sprayed onto the food to be protected.

If the powder is to be extended with water, in many cases it is desirable to include a surface-active agent of the kind sometimes referred to in the art as a wetting, dispersing or emulsifying agent. These materials cause the powders to disperse or emulsify easily in water to give aqueous baths or sprays.

The surface-active agents employed can be of the anionic, cationic or non-ionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in "Synthetic Detergents," Soap and Sanitary Chemicals, July, August, September and October, 1952.

Our compositions can be applied effectively to fruit and vegetables at any time before they undergo excessive spoilage. For example, aqueous dispersions of alpha-lipoic acid can be used as the wash water for fruit and vegetables. Alternatively, the fruit and vegetables can be passed through an aqueous spray containing the active ingredient subsequent to washing. If desired, the fruit and vegetables can either be dusted or sprayed with a composition comprising a compound of Formula 1 during or after crating of the vegetables. Likewise, our anti-spoilage method can be practiced by wrapping the fruit and vegetables in paper treated with a composition containing a compound of Formula 1.

In order that the invention can be better understood, the following examples in addition to those set forth above are given:

Example 1

A wettable powder composition of the listed ingredients is prepared by mixing the ingredients and passing them twice through a micropulverizer having a 0.020 inch round-hole screen.

|  | Percent |
|---|---|
| Alpha-lipoic acid | 84.21 |
| Alkyl naphthalene sulfonic acid sodium salt (wetting agent) | 1.00 |
| Methyl cellulose, 15 cps. (dispersant) | 0.30 |
| Attapulgite | 14.49 |

This composition is then dispersed in water to form a bath containing 1% of the active ingredient. When this bath is used to wash asparagus spears, it forms a residual deposit on drying which is effective in controlling gray mold rot (*Botrytis species*).

Example 2

The following composition when prepared in accordance with the procedure of Example 1 is a wettable powder that is readily dispersed in water.

|  | Percent |
|---|---|
| Gamma-lipoic acid | 84.21 |
| Lauryl pyridinium chloride (wetting agent) | 4.00 |
| China clay | 11.79 |

This composition is then dispersed in water to form a bath containing 0.5% of the active ingredient. This bath forms a residual deposit on apples that are passed through the bath, which deposit is unusually resistant to washing. Apples thusly treated are highly resistant to attack from blue mold (*Penicillium expansum*).

This protective bath, when used to wash strawberries, is effective in controlling soft rot of the strawberries (*Rhizopus nigricans*).

Example 3

The following dust formulation is prepared by first blending and micropulverizing the active compound and the attapulgite. This mixture is then blended with talc in a ribbon blender to yield a homogeneous mixture. The resulting dust is applied with a dust gun to carrots that have been washed and are still damp. This treatment gives effective control of gray mold rot (*Botrytis species*).

|  | Percent |
|---|---|
| Alpha-lipoic acid | 5.26 |
| Attapulgite | 1.32 |
| Talc | 93.42 |

Example 4

Tomato leaves are sprayed with water containing 0.2% and 0.04% 1,2-dithiolane-3-enanthic acid. The tomato leaves are allowed to dry and then they are inoculated with spores of the tomato early blight fungus (*Alternaria solani*). Other tomato leaves are sprayed with water in which there was no chemical and then inoculated with spores of the tomato early blight fungus in a like manner.

The subsequent spread and development of the early blight disease was effectively prevented on those leaves which were sprayed with 1,2-dithiolane-3-enanthic acid while the disease spread and developed on those plants which were not sprayed with the chemical.

Example 5

The wettable powder of Example 1, when used in a water bath containing 1% of the active ingredient to wash tomatoes, leaves a residual deposit on drying which is effective in controlling Phoma rot (*Phoma destructiva*).

Example 6

The washing bath of Example 2 which contains 0.5% active ingredient, when used to wash asparagus spears, leaves an unusually resistant deposit after drying. Asparagus spears thusly treated are highly resistant to attack from Fusarium rot (*Fusarium species*).

While the invention has been illustrated in detail with respect to control of fungi which attack fruits and vegetables, it will be understood that the compounds of Formula 1 can also be used to control fungi which attack vegetation, esepcially crop and ornamental vegetation, and to control fungus infestation of other materials, for example, wood, tentage, and the like.

We claim:

1. A method for controlling the spoilage of fruits and vegetables caused by fungi which comprises applying to the fruits and vegetables, in a fungicidally effective amount, a compound of molecular weight not more than 500 and of the formula R—R′—COR″ wherein R is a monovalent radical of the class consisting of $$\begin{array}{cc} \underset{S\underline{\hspace{1cm}}S}{CH_2-CH_2-CH-}, & \underset{SH\quad SH}{CH_2-CH_2-CH-} \\ \underset{\underset{O}{\overset{\|}{S}}\underline{\hspace{1cm}}S}{CH_2-CH_2-CH-}, & \underset{\underset{O}{\overset{\|}{S}}\underline{\hspace{1cm}}\underset{O}{\overset{\|}{S}}}{CH_2-CH_2-CH-} \end{array}$$

and C-lower alkyl derivatives of said radicals wherein the alkyl groups are of up to four carbon atoms, R′ is a divalent hydrocarbon radical of not more than 8 carbon atoms and COR″ is selected from the class consisting of carboxyl and groups hydrolyzable thereto.

2. A method for controlling the spoilage of fruits and vegetables caused by fungi which comprises applying to the fruits and vegetables alpha-lipoic acid in an amount of from about 0.5 to 10.0 ounces per bushel.

3. A fungicidal composition containing as an essential active ingredient in admixture with a surface active agent, a compound of molecular weight not more than 500 and of the formula R—R′—COR″ wherein R is a monovalent radical of the class consisting of $$\begin{array}{cc} \underset{S\underline{\hspace{1cm}}S}{CH_2-CH_2-CH-}, & \underset{SH\quad SH}{CH_2-CH_2-CH-} \\ \underset{\underset{O}{\overset{\|}{S}}\underline{\hspace{1cm}}S}{CH_2-CH_2-CH-}, & \underset{\underset{O}{\overset{\|}{S}}\underline{\hspace{1cm}}\underset{O}{\overset{\|}{S}}}{CH_2-CH_2-CH-} \end{array}$$

and C-lower alkyl derivatives of said radicals wherein the alkyl groups are of up to four carbon atoms, R' is a divalent hydrocarbon radical of not more than 8 carbon atoms and COR" is selected from the class consisting of carboxyl and groups hydrolyzable thereto.

4. The composition of claim 3 wherein the active ingredient is alpha lipoic acid.

5. The composition of claim 3 wherein the active ingredient is gamma lipoic acid.

References Cited in the file of this patent

UNITED STATES PATENTS 2,706,158    Searle _____ Apr. 12, 1955

OTHER REFERENCES

Gunsalus: Chemical Abstracts, 48, 1954, p. 8275g.